United States Patent [19]

Henderson

[11] 4,127,796
[45] Nov. 28, 1978

[54] CRT DISPLAY ANTI-BURN CIRCUIT
[75] Inventor: Alan R. Henderson, Carlsbad, Calif.
[73] Assignee: Hughes Aircraft Company, Culver City, Calif.
[21] Appl. No.: 799,804
[22] Filed: May 23, 1977
[51] Int. Cl.$^2$ .................. H01J 29/70; H01J 29/72
[52] U.S. Cl. .................................. 315/395; 358/220
[58] Field of Search .................. 315/393, 394, 395; 358/220

[56] References Cited
U.S. PATENT DOCUMENTS

| | | | |
|---|---|---|---|
| 2,974,254 | 3/1961 | Fitzmaurice et al. | 315/393 |
| 3,440,480 | 4/1969 | Henderson | 315/394 |
| 3,484,647 | 12/1969 | McGuinness | 315/386 |

Primary Examiner—Theodore M. Blum
Attorney, Agent, or Firm—W. H. MacAllister; E. N. Kramsky; J. E. Szabo

[57] ABSTRACT

Damage to the phosphorescent screen of a cathode ray tube (CRT) by an electron beam is minimized by preventing the display of a stationary image on the screen. This is accomplished by superimposing or adding to each of the normal electron beam deflecting voltages an additional triangular offset waveform, with the combined effect of the offset waveforms being to constantly move the entire electron scan pattern over an infrequently recurring path at a slow enough rate to be imperceptible to the viewer.

10 Claims, 4 Drawing Figures

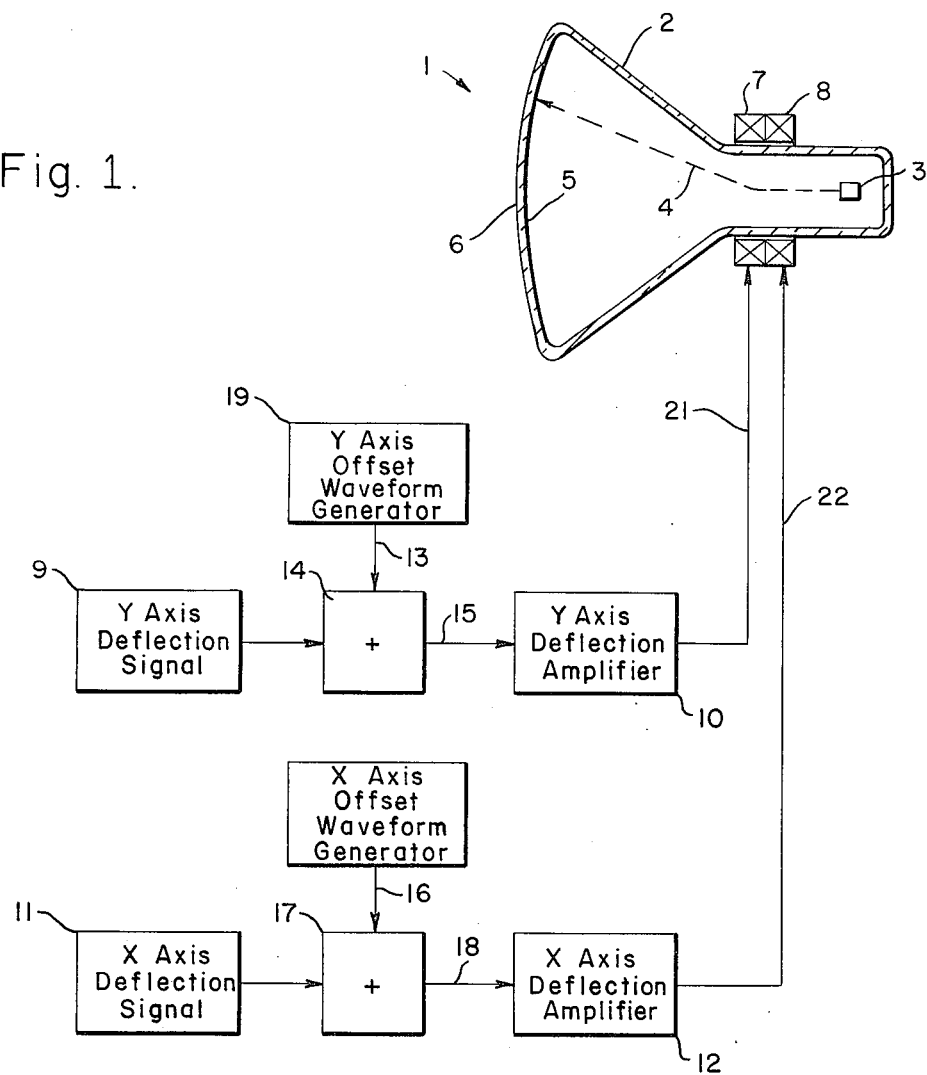
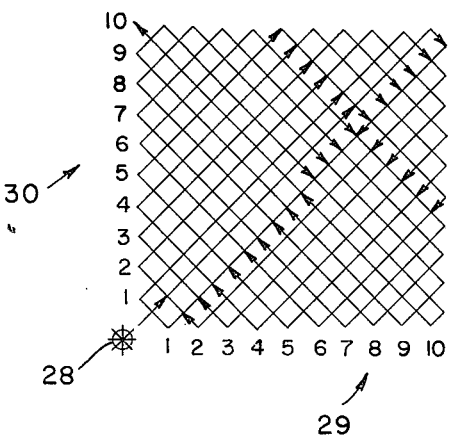
Fig. 1.
Fig. 3.

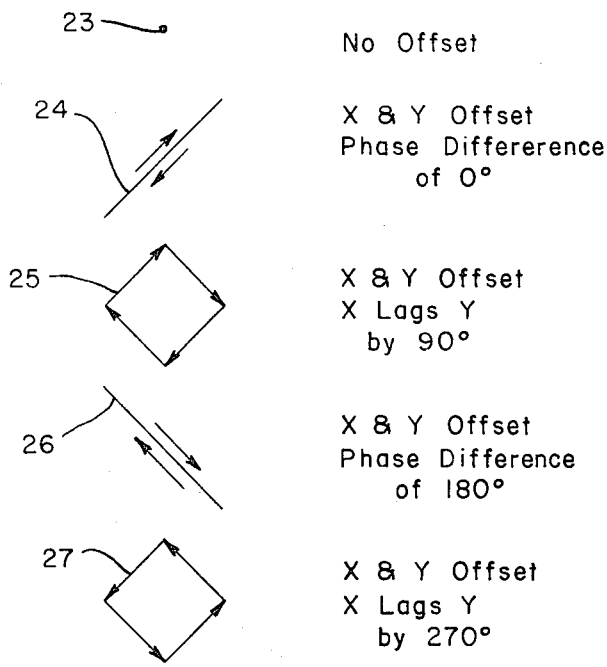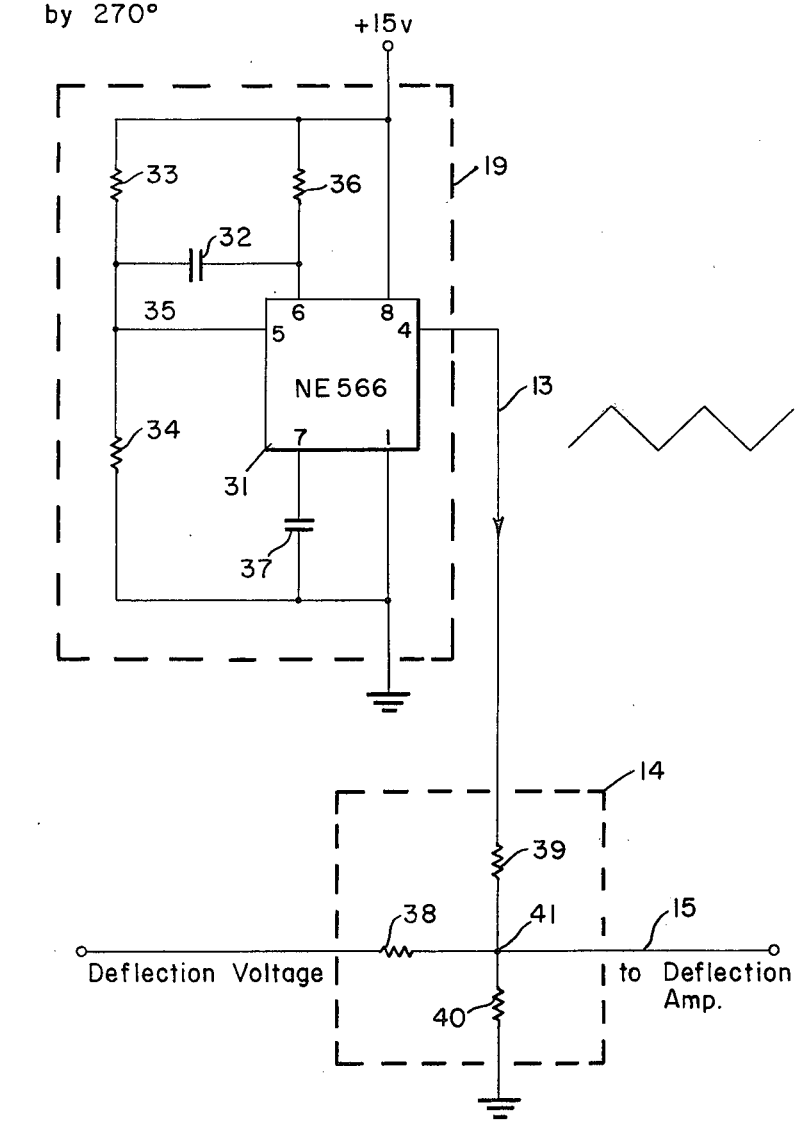
Fig. 2.
Fig. 4.

CRT DISPLAY ANTI-BURN CIRCUIT

BACKGROUND OF THE INVENTION

This invention relates generally to systems utilizing a cathode ray tube (CRT) and more particularly to a means for preventing burn-in effects on the CRT caused by prolonged display of the same image.

To display an image on the face of a CRT, an electron beam is scanned across a phosphorescent coating on the inside of that face in successive horizontal lines which progress from top to bottom. The electron beam intensity is modulated with the information to be displayed so that the phosphorescent coating is caused to glow in a pattern corresponding to that image. Alternatively, the electron beam may be scanned by voltages representing successive pairs of vectors along the resultant of which the beam is to be moved. Normally, the image moves, as in television, so that no particular area of the screen is singled out for extended electron beam bombardment. Thus, the electron beam normally does not land on any spot for a long enough time to damage the phosphorescent layer. The same is not true, however, when the displayed image is stationary and particularly when it is both stationary and sharply outlined. In such cases, the electron beam is traced repeatedly along the same path across the phosphorescent coated faceplate. The damage that results is what is called "burn-in" and it can leave a permanent and highly undesirable "scar" along which the phosphorescent coating is damaged. Consequently, when another image is subsequently sought to be displayed, the outline of the burn-in path may become partially or totally visible.

It is therefore a principal object of the present invention to prevent burn-in of a CRT by the sharply focused electron beams encountered in many applications, including but not limited to alphanumeric, line and spot displays of computer information; stationary boundaries of television games, highlights of stationary television scenes, especially those that occur with closed circuit fixed camera surveillance; and stationary images of ground based radar displays.

A more specific object of this invention is to provide optimized CRT burn-in protection through the use of a constant velocity, uniform coverage periodic electron beam traverse, which is comparatively simple in its structure, reliable in operation, and low in cost.

These and other objects of the invention are attained through the realization that the most suitable path for the movement of an electron beam image is one in which, over a prolonged time, a given displayed spot traverses uniformly all points contained within the extremes of its travel and traverses those extremes during each offset period. Such a path yields the highest probability that maximum intensity electron bombardment of any particular light emitting phosphor molecule will be of short duration compared to an offset period and that any such molecule will receive low average bombardment over one offset period; thus yielding the optimum protection against burn-in.

Such a uniformly varying path may be achieved by the use, in each axis deflection amplifier, of a triangular waveform offset voltage whose phase relationship with the triangular waveform offset voltage of the other axis varies uniformly. Other waveforms, such as the sine wave, could be used, but only the triangular waveform has the characteristic of uniform amplitude rate-of-change versus time. Any of several means can be used to generate the required waveforms, including motor driven potentiometers, mask movement between photocells and light sources, and constant current charging and discharging of capacitors. The latter means, utilizing transistor integrated circuits, offers many advantages, including the lack of moving parts, small size and weight, low cost, stability and indefinitely long life.

The above-mentioned and other features and objects of this invention and the manner of obtaining them will become more apparent and the invention itself will be best understood by reference to the following description of a preferred embodiment of the invention taken in conjunction with the accompanying drawings; wherein:

FIG. 1 is a block diagram of the cathode ray tube and its beam deflection system incorporating the invention;

FIG. 2 is a diagram showing spot traverse patterns with various phase relationships between X axis (horizontal) and Y axis (vertical) offsets;

FIG. 3 is a diagram showing a serpentine spot traverse pattern with a uniformly varying phase relationship between X axis and Y axis offsets and covering ten deflection periods of the X axis; and FIG. 4 is a schematic diagram of the embodied waveform generation and summation circuit used for each axis.

Referring now to FIG. 1, there is shown a conventional cathode ray tube 1 having an enclosed envelope 2, a cathode 3 which emits a sharply focused electron beam 4 which bombards a thin phosphor target layer 5 deposited on the inner surface of the faceplate 6. The electron beam 4 is deflected by the Y (vertical) axis deflection coil 7 and the X (horizontal) axis deflection coil 8 to generate a raster of downwardly progressing succession of signal modulated horizontal scans on the target layer 5. It will be readily understood that suitable focusing and accelerating electrodes will conventionally be provided as is well known to those skilled in the art. It will also be understood that the present invention is equally applicable to other beam deflecting systems such as those for example, wherein the electron beam is translated along a succession of straight or curved line segments, generated by applying voltages representing the Y and X components of those lines segments to the Y and X deflection coils 7 and 8. In either case the deflection coils serve to impart movement to the electron beam 4 in mutually orthogonal direction.

In a conventional cathode ray tube deflection system a Y (vertical) axis deflection signal 9 would be applied to the input of a Y axis deflection amplifier 10 and an X (horizontal) axis deflection signal 11 would be applied to the input of an X axis deflection amplifier 12. In accordance with the invention, however, the Y axis deflection signal 9 and a Y axis offset waveform signal 13 are added in a Y axis signal summing network 14 and the resultant Y axis deflection summation signal 15 is applied to the input of the Y axis deflection amplifier 10. In like manner, the X axis deflection signal 11 and an X axis offset waveform signal 16 are added in an X axis signal summing network 17 and the resultant X axis summation signal 18 is applied to the input of the X axis deflection amplifier 12. The Y axis offset waveform 13 is generated by a Y axis offset waveform generator 19, and the X axis offset waveform is generated by an X axis offset waveform generator 20. The amplified Y axis summation signal 21 is applied to the conventional Y axis deflection coil 7, and the amplified X axis summation signal 22 is applied to the conventional X axis deflection coil 8.

In FIG. 2 there are presented spot traverse patterns resulting from "no offset" waveform (23), X axis and Y axis offset waveforms with no phase difference (24), X axis and Y axis offset waveforms with X lagging Y by 90° phase angle (25), X axis and Y axis offset waveforms with X lagging Y by 180° phase angle (26), and X axis and Y axis waveforms with X lagging Y by 270° (27). It can be readily seen that each of the traverse patterns 24, 25, 26, 27 resulting from periodic offset triangular waveforms limits the time during which any particular phosphor molecule is subjected to electron bombardment, alleviating phosphor layer damage. Protection against burn-in is maximized when the phase angle difference between the X axis and Y axis offset waveforms is varied in a continuous, linear manner, since the traverse pattern generated will go through a practically infinite variety, among which are the illustrated offset traverse patterns 24, 25, 26, 27, providing a maximized, uniformly exposed area in which the electron bombardment of any particular molecule is minimized.

FIG. 3 shows the spot traverse pattern resulting from the above-mentioned X axis and Y axis triangular waveforms having a continuous and linear change of phase angle difference. The focused spot 28 shown in an arbitrary position at time zero traverses the path shown by one continuous line in ten periods of the X axis triangular offset waveform. The spot position at the end of each Y axis offset waveform period is shown by the period numbers 29 below the traverse pattern. Similarly, the period numbers 30 to the left of the pattern show the spot position at the end of each X axis offset. The same pattern shape is retraced with further passage of time. Ten periods in FIG. 3 represent a phase difference change of 180° between the X axis offset waveform and the Y axis offset waveform. Thus, at the start of the first offset period the X and Y offset waveforms are in phase. By the end of the tenth offset period the X and Y waveforms are 180° out of phase. The number of periods required to effect a phase angle change of 180° is somewhat arbitrary but, for best results, when the extremes of offset are approximately ten times the focused spot diameter, it is believed that the number of periods should be between five and twenty. and need not be an integral number. This represents a frequency difference in the X axis and Y axis offset waveform generators of between 10 percent and two and one-half percent, respectively. This order of frequency difference is often realized through use of identically marked components with a value tolerance of plus or minus 10 percent in each axis offset waveform generator. More predictable frequency differences are obtained by using high precision components with different marked values in the X and Y axis waveform generators. Alternatively, a potentiometer in the offset waveform generator of one axis can be set to provide the desired frequency difference.

FIG. 4 is a schematic diagram of the embodied offset waveform generation circuit 19 and summation circuit 14 used for the Y axis. The X axis uses an offset waveform generation and summation circuit of identical design but slightly different actual component values. The circuit 19 comprises a commercially available integrated circuit 31, commonly designated NE 566, capacitors 32 and 37, and resistors 33, 34 and 36. One source of the NE 566 circuit is The Signetics Company of Menlo Park California. It is shown and described on pages 6-92 through 6-95 of *Digital Linear MOS Data Book*, © 1974, published by The Signetics Company. The integrated circuit 31 requires capacitor 32 for its internal stability only, and that action has no other bearing on this invention. Resistors 33 and 34 form a voltage divider between +15 volts and ground, with an output at their common junction 35. The voltage at point 35 is connected to pin 5 of the integrated circuit 31 and, in conjunction with the resistor 36 connected between +15V and integrated circuit 31 pin 6, this voltage determines the constant current which charges and discharges the capacitor 37 connected between the integrated circuit 31 pin 7 and ground. The integrated circuit 31 senses a predetermined upper threshold voltage across the capacitor 37 at which linear discharge begins, and a predetermined lower threshold voltage across that capacitor at which linear charge begins. The voltage at pin 7 is presented to an internal buffer amplifier whose low impedance output is available at pin 4 of integrated circuit 31. This low impedance output signal is the aforementioned Y axis offset waveform signal 13. It is applied to one input of the summing circuit comprised of a simple network of three resistor 38, 39 and 40, each having one end connected to a common node 41. Resistor 38 serves as the current source resistor for the deflection voltage which is applied to its free end from the Y axis deflection generator 9. The resistor 39 performs the same function for the offset waveform which is applied to its free end from the generating circuit 19. Resistor 40 serves as a relatively low valued current sink generator with its free end being connected to ground. The Y axis deflection summation signal 15 appears at the node 41 and is applied to the input of the Y axis deflection amplifier 10.

With a +15 volt power supply connected to pin 8 of the integrated circuit 31 and ground connected to its pin 1, the triangular offset waveform 13 has approximately 2.8 volts peak-to-peak amplitude. Nominal component values in the offset waveform generation circuit are:

| | |
|---|---|
| 32 | .001 μf |
| 33 | 1000 ohms |
| 34 | 39,000 ohms |
| 36 | 10,000 ohms or a potentiometer variable from 7,5000 ohms to 12,500 ohms |
| 37 | 220 μf |

With the component values shown, the offset waveform 13 has a period of approximately 40 seconds. The peak-to-peak current through the deflection current source resistor 38 is selected to cause deflection of the CRT electron beam image to the edge of the CRT viewing area and is approximately one hundred times the peak-to-peak current through the offset waveform current source resistor 39. This peak-to-peak current proportion provides about 0.12 inch peak-to-peak offset per axis. Thus, neither the rate nor the amplitude of displacement is sufficient to render the movement caused by the offset waveform 13 perceptible to the viewer.

The deflection summation network could be implemented through the use of a differential input operational amplifier, a separate offset waveform deflection amplifier with summing performed at the deflection coil, or an auxiliary deflection coil for each axis which carries only triangular offset waveform current. The actual point in the system of conventional deflection and offset deflection summation is subordinate in importance to the achievement of summation and the aforementioned objects of this invention.

While the system of the invention has been described and illustrated with a cathode ray tube having magnetic deflection, it will be understood that the problem of phosphor burn-in exists equally in cathode ray tubes having electrostatic deflection and can be solved by the same technique. It is also to be understood that, although the use and advantages of uniformly varying phase difference triangular offset waveforms is herein described, other offset waveforms with a varying or fixed phase difference provide substantial phosphor burn-in protection compared with conventional cathode ray tube deflection systems. Moreover, a uniformly varying phase difference between axis offset waveforms need not be attained by using a separate waveform generator of fixed period for each axis, wherein the period of each generator is different from that of the other such generator. Such a uniformly varying phase difference between two waveforms might also be created by using a generator to produce one waveform to be used as the offset signal for one axis, with the same signal being applied also to the input of a uniformly varying phase shifter whose output would provide the offset signal for the other axis.

While the principles of this invention have been described in connection with specific apparatus, it is to be clearly understood that this description is presented only by way of example and not as a limitation to the scope of the invention.

What is claimed is:

1. In a cathode ray tube display system the combination comprising:
   (a) a cathode ray tube having a sealed envelope which includes a faceplate having an inner surface coated with a phosphorescent compound;
   (b) means in said envelope for generating an electron beam and projecting it at said coated surface;
   (c) first and second means for deflecting said electron beam across said faceplate, said first and second means imparting movement to said electron beam in mutually orthogonal directions in response to deflection signals applied thereto;
   (d) first and second means for individually applying to said first and second deflecting means respectively, first and second periodic deflection signals; and
   (e) means for generating, and individually adding to said first and second deflection signals respectively, first and second periodic out-of-phase offset signals, said first and second out-of-phase offset signals being of relatively low frequency and small magnitude with respect to the resultant of said first and second periodic deflection signals whereby the deviation of said beam due thereto is not perceptible to the human eye.

2. The combination of claim 1 characterized further in that said offset signals differ in phase by a uniformly changing amount.

3. The combination of claim 2 characterized further in that both of said offset signals have triangular waveforms whose frequencies differ by an amount which is between 2 and 10% of their mean frequency.

4. The combination of claim 1 characterized further in that said means for generating and adding said offset signals include a pair of individual triangular waveform signal generators.

5. The combination of claim 4 characterized further in that said waveform generators have identical circuit configurations and identical nominal values for corresponding components, the nominal random variation between the values of corresponding components of said waveform generators being sufficient to effect a frequency difference between the waveforms generated by them.

6. The combination of claim 3 characterized further in that said frequency difference is between 2% and 10% of the mean frequency of the waveforms generated by them.

7. The combination of claim 1 characterized further in that said means for generating and adding includes a single triangular waveform generator and a phase shifter connected to receive the output of said generator and operative to produce a second triangular waveform output whose phase varies from the output of said generator by a continually and uniformly varying amount.

8. A method of preventing burn-in of a CRT having a screen across which a cathode ray beam is scanned by means of vertical and horizontal beam deflectors under the influence of horizontal and vertical deflection signals applied to said deflectors comprising the steps of:
   (a) adding to the horizontal deflection signal being applied to said horizontal beam deflector a first periodic offset signal; and
   (b) adding to the vertical deflection signal being applied to said vertical beam deflector a second periodic offset signal whose phase is different from that of said first offset signal so that the traverse of said screen by said cathode ray beam is deviated at a sufficiently slow rate and over a sufficiently small distance that said deviation is not perceptible to the human eye.

9. The method of claim 8 characterized further in that said second offset signal has a phase which differs from that of said first offset signal by a continually varying amount.

10. A method of preventing burn-in of a CRT having a screen across which an electron beam is scanned by means of vertical and horizontal beam deflectors under the influence of horizontal and vertical deflection signals applied to said deflectors comprising the steps of:
   (a) displacing the pattern traced by said beam under the influence of said deflection signals over a serpentine path at a rate and over a distance which in combination renders said displacement imperceptible to the human eye during normal viewing.

* * * * *